United States Patent [19]
Chen

[11] Patent Number: 6,106,313
[45] Date of Patent: Aug. 22, 2000

[54] UNIVERSAL CARD CONNECTOR

[75] Inventor: Wen-Hsiung Chen, Taipei, Taiwan

[73] Assignee: Molex Incorporated, Lisle, Ill.

[21] Appl. No.: 09/262,771

[22] Filed: Mar. 4, 1999

[30] Foreign Application Priority Data

Mar. 4, 1998 [TW] Taiwan .................................. 87203130

[51] Int. Cl.[7] ................................................. H01R 13/62
[52] U.S. Cl. ............................................................ 439/159
[58] Field of Search ................................... 439/152–160, 439/372, 341

[56] References Cited

U.S. PATENT DOCUMENTS

| | | | |
|---|---|---|---|
| 5,389,001 | 2/1995 | Broschard, III et al. | 439/159 |
| 5,421,737 | 6/1995 | Chen et al. | 439/157 |
| 6,022,228 | 2/2000 | Kuo | 439/159 |

*Primary Examiner*—Paula Bradley
*Assistant Examiner*—Tho D. Ta
*Attorney, Agent, or Firm*—Stacey E. Caldwell

[57] ABSTRACT

A universal connector for a memory card comprising a connector body, an ejecting mechanism and a fixing stage. The connector body includes a guiding stage and clamping body on the left and right side thereof. The ejecting mechanism comprises an operation actuator and an ejecting plate. The operation actuator is arranged on the guiding stage located on either the left or right side of the connector body. The fixing stage may be located on either the left or right side of the connector body. The fixing stage is provided with a locking hole and clamping tooth. The clamping tooth is adapted to engage a corresponding clamping body of the connector body to fix the fixing stage to the connector body and position the operation actuator of the ejecting mechanism on either the left or right side of the connector body.

5 Claims, 5 Drawing Sheets

UNIVERSAL CARD CONNECTOR

FIELD OF THE INVENTION

The present invention relates to a universal connector for a memory card and, more particularly, to a universal card connector adapted for use with right or left-hand actuated ejector mechanisms.

BACKGROUND OF THE INVENTION

Connectors for cards have found wide application in notebook computers, into which a card such as a memory card can be easily inserted into or extracted from the computer. A conventional card connector is provided with an ejecting mechanism which ejects the card from the computer. However, the operation actuator of the ejecting mechanism is typically located on a predetermined side of the connector such as the left side or the right side and is not adaptable to be relocated on the other side. A certain configuration may be unacceptable for certain applications and therefore a completely different connector must be made, assembled and inventoried in order to accommodate such applications. Moreover, once the connector is mounted to an underlying substrate, the ejecting mechanism is typically fixed with nuts such that the assembly of the connector is unduly troublesome.

SUMMARY OF THE INVENTION

The present invention provides an improved card connector comprising a connector body, an ejecting mechanism and a fixing stage. The operation actuator of the ejecting mechanism can be arranged on the left or right side of the connector body. The location of the actuator is adjusted by moving the actuator to a guiding stage on either the left or right side of the connector body. A clamping tooth and clamping body between the connector body and the fixing stage engage each other, thus providing flexibility and consequent cost savings by providing a single connector that can meet various needs. Furthermore, the location of the fixing stage is fixed by screw only, thus avoiding the use of nuts and simplifying the assembly task The various objects and advantages of the present invention will be more readily understood from the following detailed description when read in conjunction with the appended drawings, in which:

DETAILED DESCRIPTION OF PREFERRED EMBODIMENT

Figure 5:
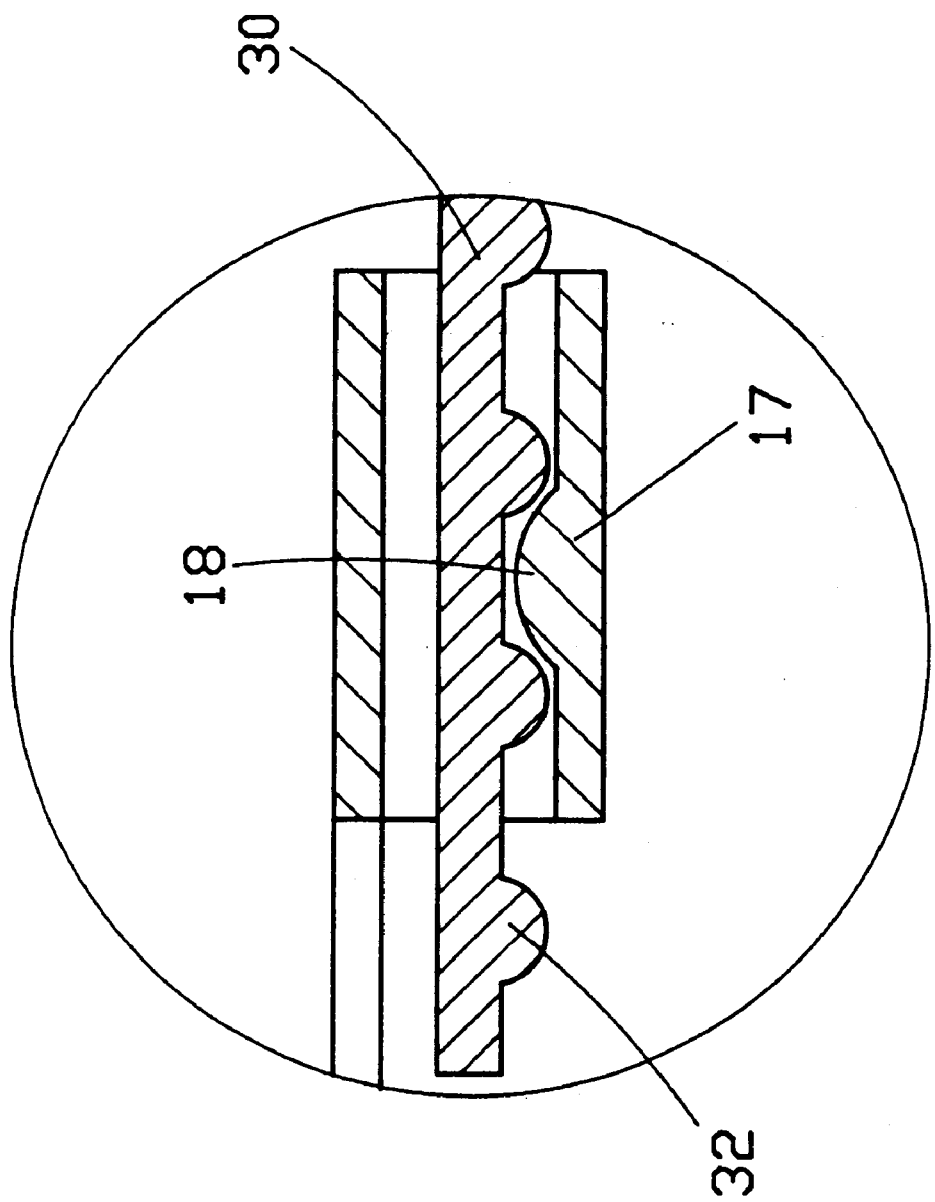
FIG. 5 is a partial cross-section view showing the connector body and the fixing stage.

As shown in FIGS., 1, 2 and 3, the present invention provides an improved card connector used for mounting and ejecting a card such as a memory card. The connector comprises a connector body 10, an ejecting mechanism 20 and a fixing stage 30. Connector body 10 comprises a first panel 11 and a second panel 12 which are connected through a coupling part 13 and corresponding coupling hole 14 arranged on a lateral side thereof, thus providing a space for accommodating a memory card. Moreover, each of the two lateral sides of connector body 10 is provided with a guiding stage 15. The two lateral sides of connector body 10 are also provided with a stage body 17 which includes a clamping body 18, as shown in FIG. 5. The rear side of connector body 10 is provided with a pivot member 16.

Ejecting mechanism 20 comprises an operation actuator 21 and an ejecting plate 22, wherein operation actuator 21 is adapted to be optionally arranged on either guiding stage 15 on the right or left side of connector body 10. Ejecting plate 22 is arranged on the rear side of the connector body and has a pivot part 23 on a center part thereof. Pivot part 23 is pivotally connected to pivot member 16 on the rear side of connector body 10. Ejecting plate 22 pivots about pivot member 16 such that ejecting plate 22 is movably arranged on an inner rear end of connector body 10. One end of ejecting plate 22 has a connection part 24 inserted into a connection hole 25 on the rear end of operation actuator 21 such that one end of ejecting plate 22 is connected to the rear end of operation actuator 21. Moreover, the other end of ejecting plate 22 is provided with an ejecting part 26. Ejecting plate 22 will have a different configuration depending on which side of the connector body the actuator is arranged.

Figure 1:
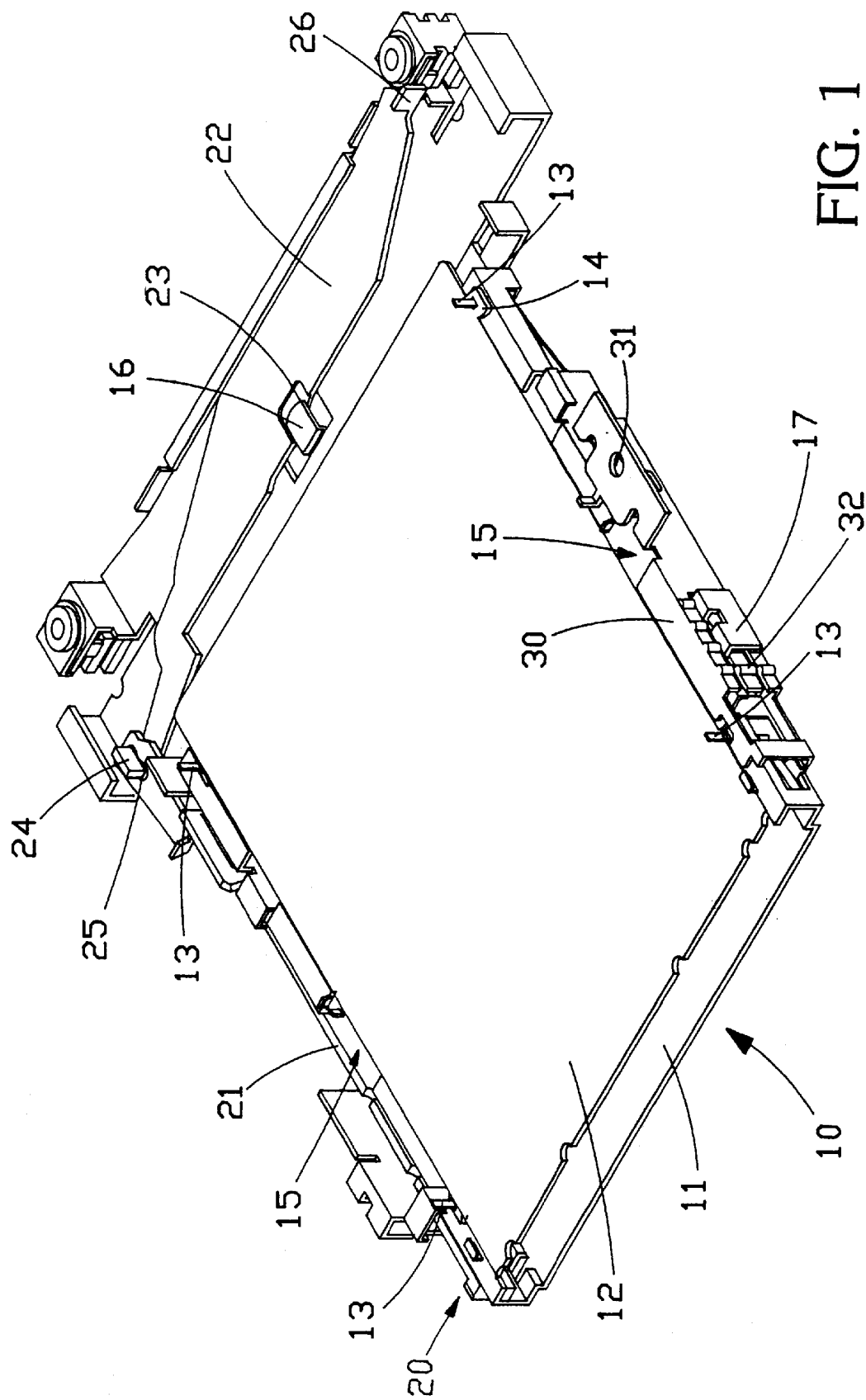
FIG. 1 shows a perspective view of the present invention.
Figure 2:
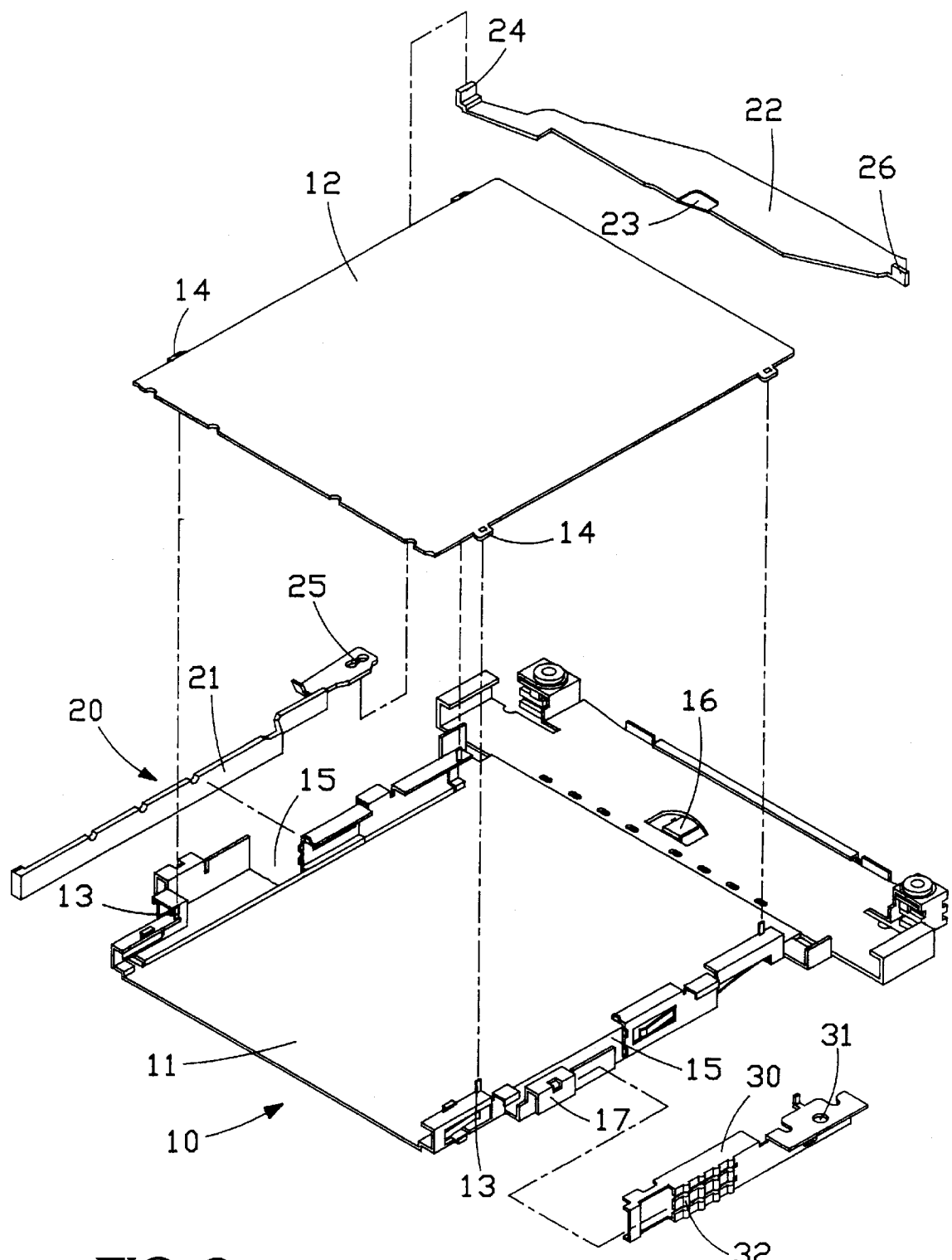
FIG. 2 shows a exploded view of the present invention.
Figure 3:
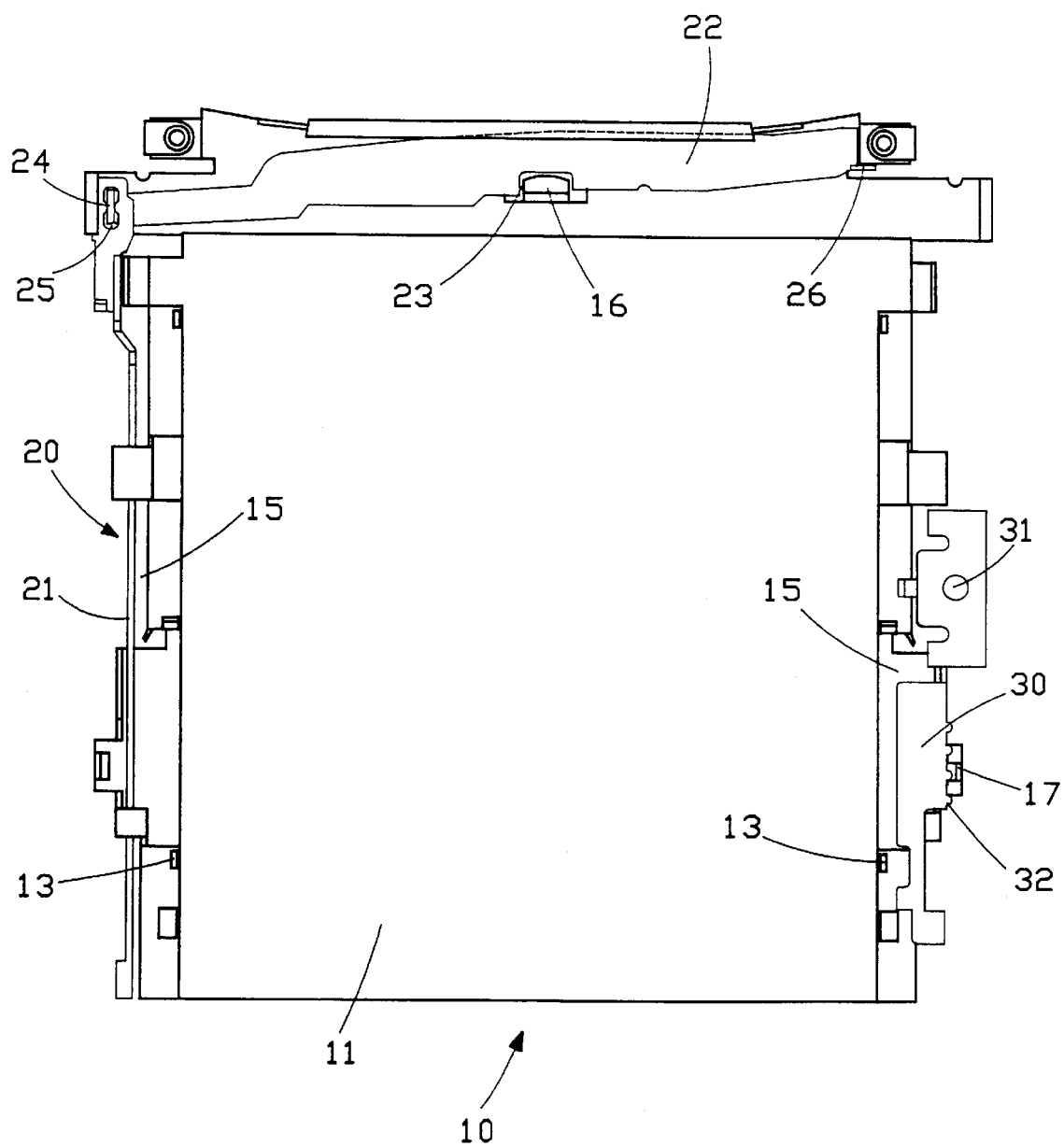
FIG. 3 shows a top view of the present invention wherein the second panel is removed.
Figure 4:
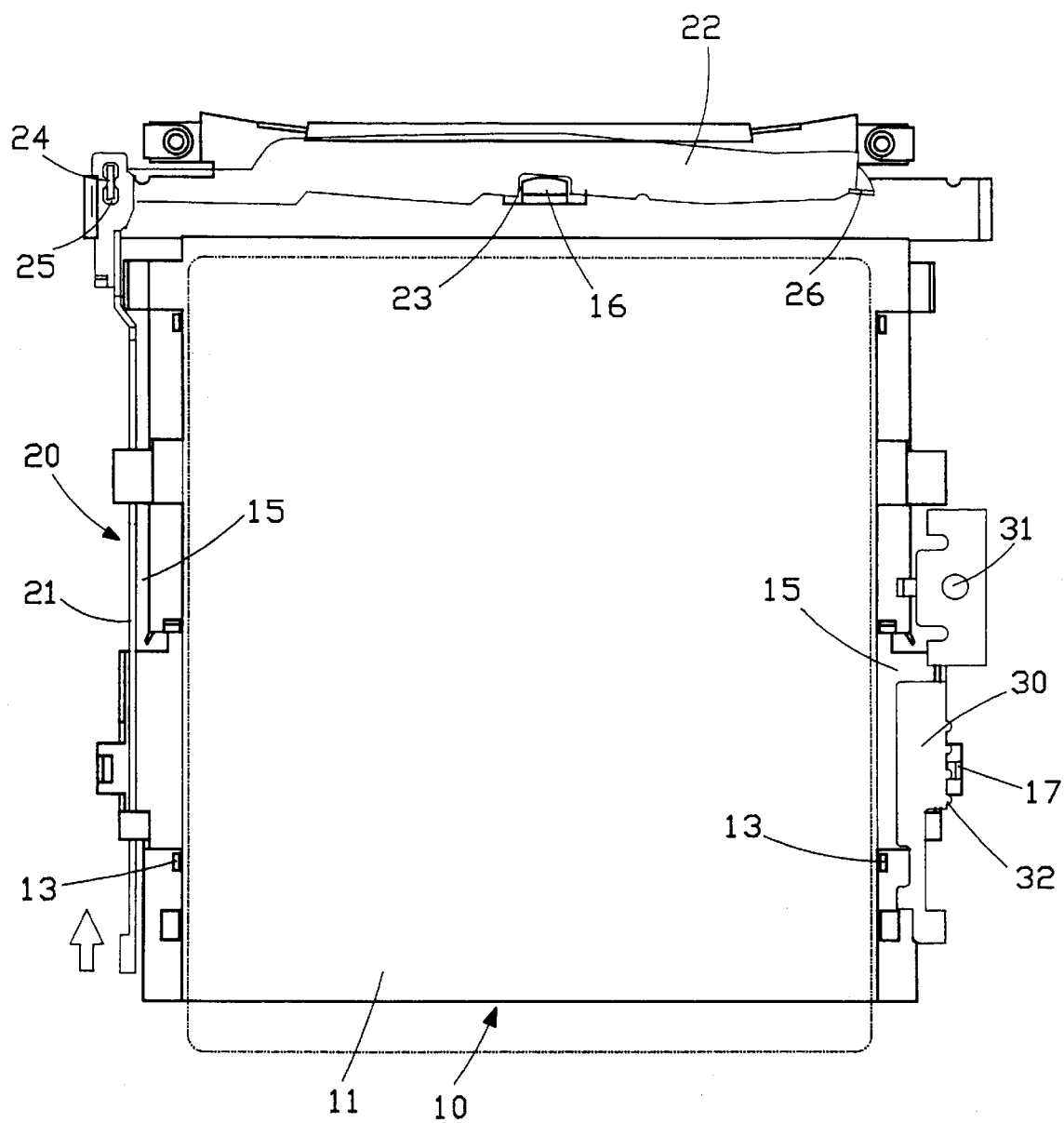
FIG. 4 is a top view of the present invention in application wherein the second panel is removed.

Fixing stage 30 is U-shaped and is adapted to be arranged on either the left or right side of connector body 10. Fixing stage 30 has a locking hole 31 for a screw (not shown) by which the fixing stage is mounted in a selected position on an underlying printed circuit board (not shown). Fixing stage 30 may be mounted on one or both sides of the connector body depending on a user's requirements. Furthermore, if two fixing stages are used, the same configuration fixing stage may be used on both sides of the connector body if the fixing stage are to be asymmetrical with respect to the connector body, or a differently configured fixing stage could be used on opposite sides of the connector body if the fixing stages are desired to be symmetrical with respect to the connector body. Fixing stage 30 is further provided with a ripple-shaped clamping tooth 32, which is adapted to elastically engage clamping body 18 (FIG. 5) of connector body 10 such that a multi-sectional clamping structure is formed between connector body 10 and fixing stage 30, and fixing stage 30 can be clamped and held with respect to connector body 10. Fixing stage 30 therefore holds the connector in place with respect to the underlying printed circuit board;

As shown in FIG. 4, the pushing of operation actuator 21 of the ejecting mechanism 20 in the direction of the arrow, drives ejecting part 26 of ejecting plate 22 to eject the memory card. The memory card can then be easily extracted by a user.

Operation actuator 21 of ejecting mechanism 20 can therefore be arranged on either the left or right side of the connector. Therefore, the extra molding die and associated components and expenses needed to manufacture both left and right side assemblies for right and left ejectors is avoided. This is achieved by first locating fixing stage 30 to the left or right side of connector body 10, and connecting the fixing stage to the housing by the multi-sectional clamping structure provided by clamping tooth 32 and clamping body 18. Moreover, the present invention uses only a screw to complete the assembly, avoiding the use of nuts and thereby simplifying assembly.

In conclusion, the operation actuator of the ejecting mechanism in the present invention can be arranged on the guiding stage on either the left or right side of the connector body to meet the varying requirement of user's applications, thus saving costs associated with additional parts, including tools, inventory and assembly. The placement of the ejecting mechanism with respect to the connector is adjusted by moving the actuator within either guide stage on to the left or right side of the connector body. The connector includes a clamping tooth and clamping body arrangement which engage each other, thus allowing the position of the fixing stage, and the operation actuator, to meet varying requirements with the same components. Furthermore, the connector is fixed to an underlying circuit board by the use of screws only, facilitating assembly of the connector.

Although the present invention has been described with reference to the preferred embodiment thereof, it will be understood that the invention is not limited to the details thereof. Various substitutions and modifications are suggested in the foregoing description, and other will occur to those of ordinary skill in the art. Therefore, all such substitutions and modifications are intended to be embraced within the scope of the invention as defined in the appended claims.

I claim:

1. A universal connector for a memory card, comprising:

a connector body having a space for accommodating said memory card, and including an integrally formed guiding stage located longitudinally along each side of the connector body, wherein the connector body and the guiding stare are of a one-piece construction;

an ejecting mechanism comprising an operation actuator and an ejecting plate, said operation actuator adapted to be located in one of the guiding stages, said ejecting plate being operatively associated with said operation actuator; and a fixing stage adapted to be arranged along either of the guiding stages, and including a locking hole for mounting the fixing stage and the connector body to an underlying printed circuit board, whereby the operation actuator may be located in either of the guiding stages to effect a right or left-hand actuated ejecting mechanism.

2. The universal connector set forth in claim 1, wherein said connector body further includes a stage body having a clamping body at each side of the connector body and wherein said fixing stage is provided with a clamping tooth, said clamping tooth being engageable with said clamping body of said connector body to fix the fixing stage in place along one of the sides of the connector body.

3. The universal connector set forth in claim 1 wherein said fixing stage is U-shaped.

4. The universal connector set forth in claim 1, wherein the ejecting plate of the ejecting mechanism is pivotally connected to a rear side of the connector body.

5. A universal connector for a memory card, comprising:

a connector body having a left side and a right side and having an integrally formed guiding section along each side, wherein the connector body and the guiding section are of a one-piece piece construction;

an ejecting mechanism having an actuator adapted to be arranged in either of the guiding sections;

a fixing stage adapted to be removably fixed to either side of the connector body; and complementary interengaging clamping structure between said fixing stage and said connector body such that said fixing stage is adaptable to be fixed at one of the left side or right side of said connector body.

* * * * *